(12) United States Patent
Li

(10) Patent No.: US 8,749,972 B2
(45) Date of Patent: Jun. 10, 2014

(54) MOUNTING APPARATUS FOR POWER SUPPLY

(75) Inventor: Zhan-Yang Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 163 days.

(21) Appl. No.: 13/418,349

(22) Filed: Mar. 13, 2012

(65) Prior Publication Data

US 2012/0325760 A1   Dec. 27, 2012

(30) Foreign Application Priority Data

Jun. 21, 2011   (CN) .......................... 2011 1 0167562

(51) Int. Cl.
*H05K 7/14*   (2006.01)
(52) U.S. Cl.
USPC ........................................ 361/679.58; 211/26
(58) Field of Classification Search
USPC ................ 211/26, 26.2; 361/679.02, 679.58,
361/679.59, 679.6, 728, 730, 731, 807, 825,
361/826
See application file for complete search history.

(56) References Cited

U.S. PATENT DOCUMENTS

| | | | | |
|---|---|---|---|---|
| 5,564,804 A * | 10/1996 | Gonzalez et al. | .......... | 312/223.2 |
| 6,288,332 B1 * | 9/2001 | Liu et al. | ........................ | 174/542 |
| 6,307,756 B1 * | 10/2001 | Liu et al. | ........................ | 361/816 |
| 6,341,072 B1 * | 1/2002 | Liao | .............................. | 361/825 |
| 6,452,792 B1 * | 9/2002 | Chen | ......................... | 361/679.35 |
| 6,467,858 B1 * | 10/2002 | Le et al. | ...................... | 312/223.2 |
| 6,862,174 B2 * | 3/2005 | Chien et al. | ............. | 361/679.33 |
| 7,218,508 B2 * | 5/2007 | Chen et al. | .............. | 361/679.57 |
| 7,327,567 B2 * | 2/2008 | Chen et al. | .............. | 361/679.41 |
| 7,443,662 B2 * | 10/2008 | Chen et al. | .............. | 361/679.55 |
| 7,688,576 B2 * | 3/2010 | Kim et al. | ................ | 361/679.33 |
| 7,850,478 B2 * | 12/2010 | Lin et al. | ........................ | 439/373 |
| 8,075,070 B2 * | 12/2011 | Fan et al. | .................... | 312/223.2 |
| 8,144,483 B2 * | 3/2012 | Nakamura et al. | ............ | 361/807 |
| 8,199,499 B2 * | 6/2012 | Chen et al. | .............. | 361/679.6 |
| 8,208,261 B2 * | 6/2012 | Fan et al. | ...................... | 361/727 |
| 2004/0257754 A1 * | 12/2004 | Jeong | ............................ | 361/682 |
| 2006/0171134 A1 * | 8/2006 | Tsai | .............................. | 361/807 |

* cited by examiner

*Primary Examiner* — Jonathan Liu
*Assistant Examiner* — Stanton L Krycinski
(74) *Attorney, Agent, or Firm* — Novak Druce Connolly Bove + Quigg LLP

(57) ABSTRACT

A mounting apparatus includes a chassis and a mounting tray. The chassis includes a side plate. The side plate includes a first clipping member and a second clipping member. A clipping hole is defined in the side plate. The mounting tray is located between the first clipping member and the second clipping member. The mounting tray includes a handle, and a clasping portion is located on the handle and engaged in the clipping hole. The mounting tray is slidable relative to the first clipping member and the second clipping member in a first direction substantially parallel to the side plate, and the handle is deformable in a second direction substantially perpendicular to the first direction, to disengage the clasping portion from the clipping hole.

4 Claims, 4 Drawing Sheets

MOUNTING APPARATUS FOR POWER SUPPLY

BACKGROUND

1. Technical Field

The present disclosure relates to mounting apparatuses, and particularly to a mounting apparatus for securing a power supply to an electronic device.

2. Description of Related Art

A computer system includes a main power supply unit and a plurality of supplemental power supplies in a computer case. The supplemental power supplies are used to supply power for electronic components when the main power supply cannot supply sufficient power or shuts down. The installation of the supplemental power supplies usually involves the use of screws, which is inconvenient.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
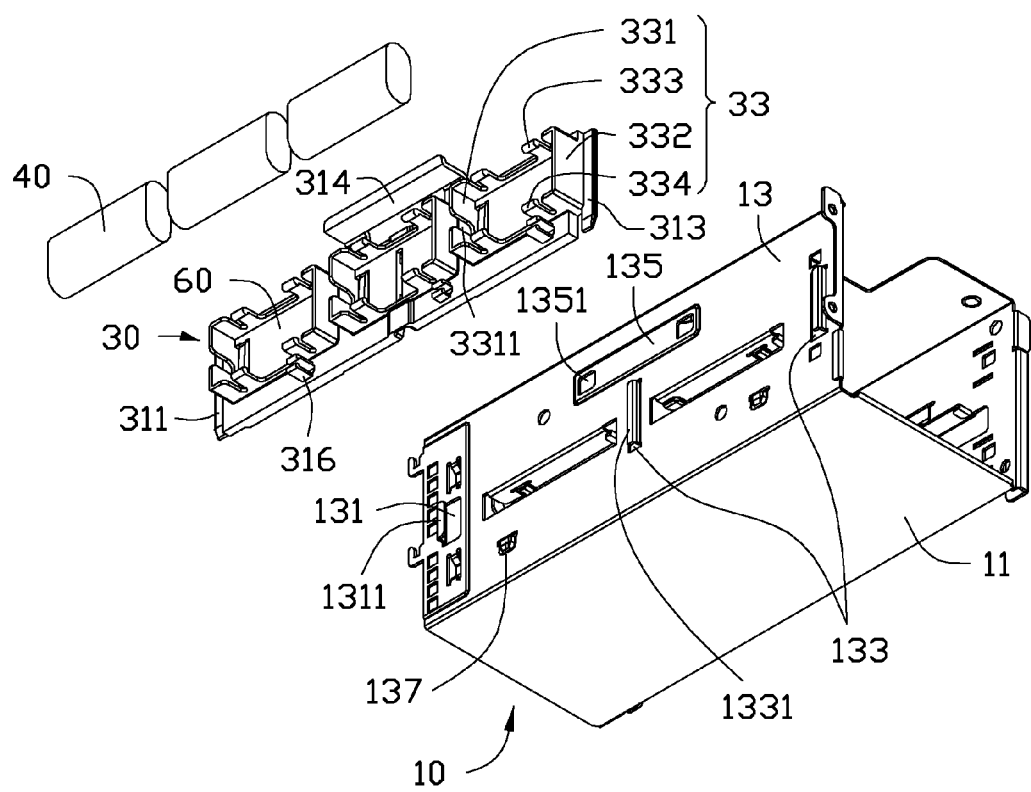
FIG. 1 is an exploded, isometric view of a mounting apparatus in accordance with an embodiment.
Figure 2:
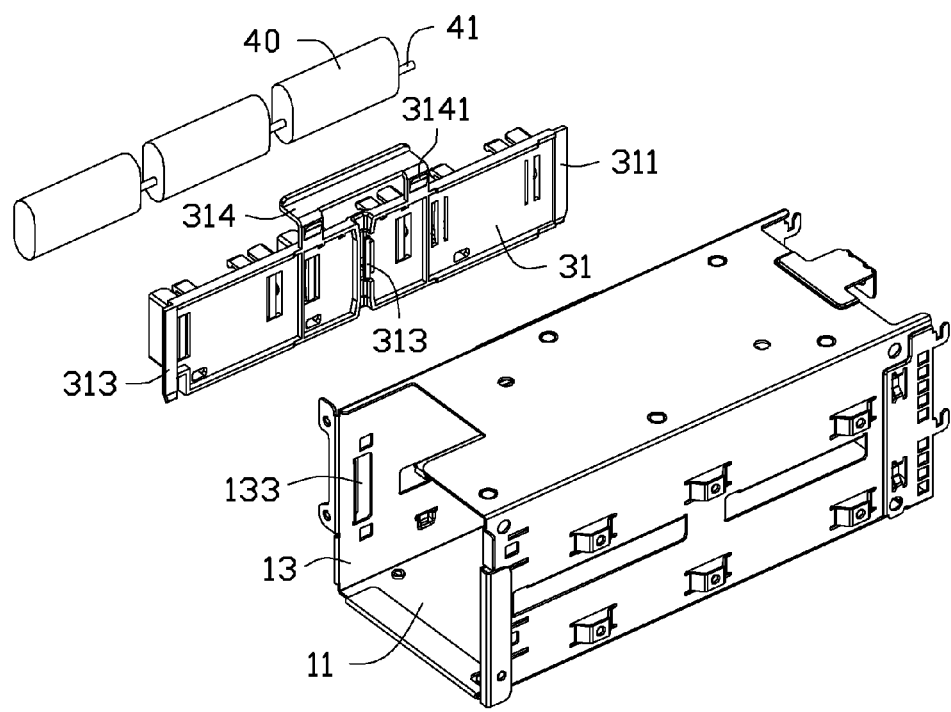
FIG. 2 is similar to FIG. 1, but viewed from a different aspect.

Referring to FIGS. 1 and 2, a mounting apparatus in accordance with an embodiment includes a chassis 10, and a mounting tray 30 attached to the chassis 10. The mounting tray 30 may receive a plurality of power supplies 40. In one embodiment, the power supplies 40 are supplemental power supplies, which are used to supply power for a riser card (not shown) received in the chassis 10.

The chassis 10 includes a bottom plate 11 and a side plate 13 connected to the bottom plate 11. In one embodiment, the side plate 13 is substantially perpendicular to the bottom plate 11. The side plate 13 defines a first opening 131 and two second openings 133. A first clipping member 1311 extends from an edge of the first opening 131 towards the two second openings 133. A second clipping member 1331 extends from an edge of each second opening 133 towards the first opening 131. In one embodiment, the first clipping member 1311 and each second clipping member 1331 are L-shaped. An extending direction of the first opening 131 and each second opening 133 is substantially perpendicular to the bottom plate 11. The first opening 131 and the first clipping member 1311 together define a first slideway, and each second opening 133 and the second clipping member 1331 together define a second slideway. A securing portion 135 and two limiting portions 137 protrude from the side plate 13. The securing portion 135 defines two clipping holes 1351.

The mounting tray 30 includes a flat base 31 and three mounting portions 33 located on a front side of the flat base 31. A first sliding portion 311 and two second sliding portions 313 are located on the flat base 31. The first sliding portion 311 corresponds to the first slideway, and the two second sliding portions 313 correspond to the two second slideways. A handle 314 is located on the top of the flat base 31, and three cable management portions 316 are located on the bottom of the flat base 31. The handle 314 defines two clasping portions 3141, and the two clasping portions 3141 are deformable to be engaged in the two clipping holes 1351. In one embodiment, each cable management portion 316 includes two inward-looking flanges, or clamping pieces, at the open end thereof, for positioning and holding captive a first cable (not shown) connected to the power supplies 40.

Each mounting portion 33 includes a first mounting frame 331 and a second mounting frame 332 pointing towards the first mounting frame 331. Two first retaining portions, such as a hook or clasp (first mounting portion 333), is located between the first mounting frame 331 and the second mounting frame 332. Two second retaining portions, which may be hooks or clasps (second retaining portion 334) are located between the first mounting frame 331 and the second mounting frame 332, and point toward the first mounting portion 333. A cutout 3311 is defined in the first mounting frame 331 to accommodate a second cable 41 of the power supply 40 extending through the first mounting frame 331. The first mounting frame 331 and the second mounting frame 332 together define a receiving space 60 for receiving a power supply 40. In one embodiment, each first mounting frame 331 and each second mounting frame 332 is C-shaped and located on a same side of the flat base 31.

Figure 3:
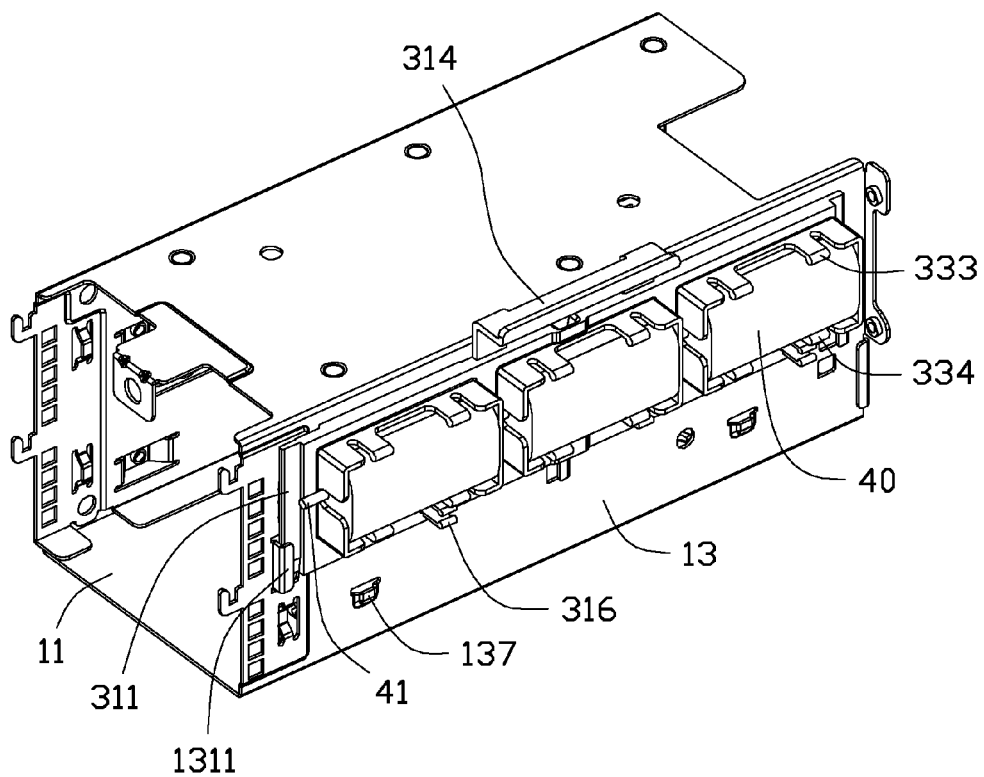
FIG. 3 is an assembled view of the mounting apparatus of FIG. 1.
Figure 4:
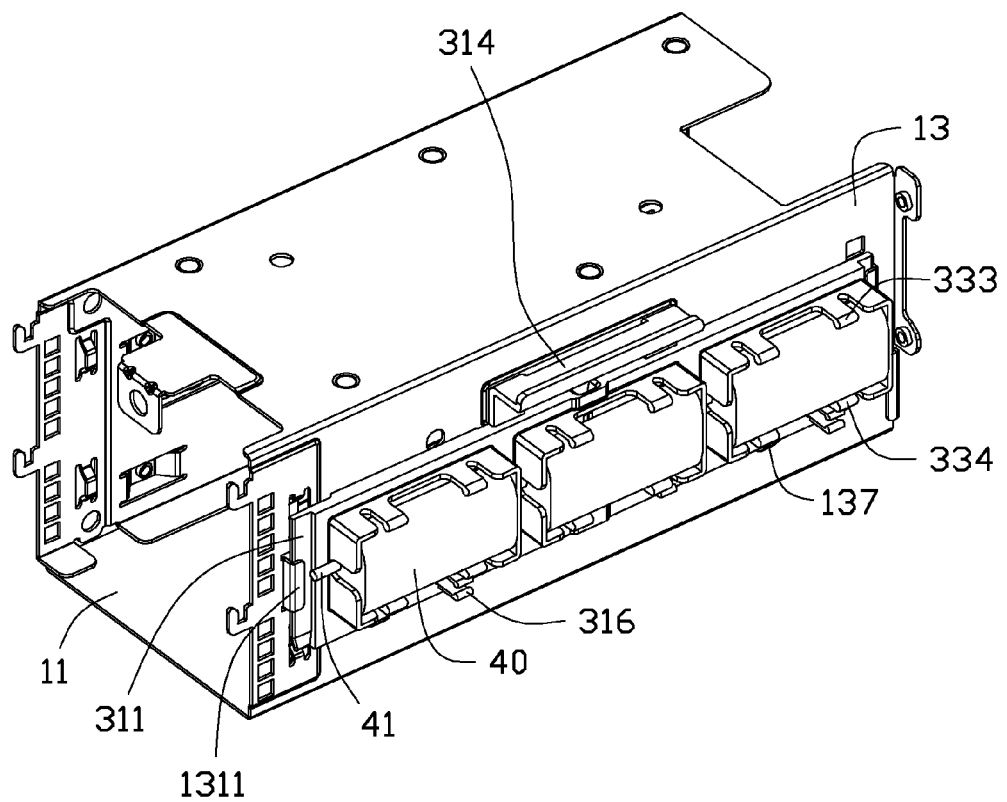
FIG. 4 is similar to FIG. 3, but viewed from a different aspect.

Referring to FIGS. 3-4, in assembly, the three power supplies 40 are received in the three receiving spaces 60. The two first retaining portions 333 and the two second retaining portions 334 grip the top and bottom portions of the three power supplies 40. The cables 41 are engaged in the cutouts 3311.

The flat base 31 abuts the side plate 13. The first sliding portion 311 is engaged with the first clipping member 1311, and the two second sliding portions 313 are engaged with the two second clipping members 1331, to prevent lateral movement of the mounting tray 30 on the side plate 13. The mounting tray 30 is moved downwards. The first sliding portion 311 slides relative to the first clipping member 1311, and the two second sliding portions 313 slide relative to the two second clipping members 1331, until the flat base 31 is stopped by the two limiting portions 137. Synchronously, the two clasping portions 3141 engage in the two clipping holes 1351, to prevent vertical movement of the mounting tray 30 on the side plate 13 after assembly.

In disassembly, the handle 314 is deformed to disengage the two clasping portions 3141 from the two clipping holes 1351. The mounting tray 30 is moved upwards, the first sliding portion 311 is slid to be disengaged from the first clipping member 1311, and the two second sliding portions 313 are slid to be disengaged from the second clipping members 1331. Thereby, the mounting tray 30 can be detached from the side plate 13. When the power supply 40 needs to removed from the receiving space 60, the power supply 40 is disengaged from the two first retaining portions 333 and the two second retaining portions 334, and the power supply 40 is thus detached from the mounting portion 33.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A mounting apparatus comprising:
    a chassis comprising a side plate; the side plate comprising a limiting portion; a first clipping member and a second clipping member; a clipping hole defined in the side plate; the limiting portion protrudes from an outer surface of the side plate at a location that is spaced a distance away from the clipping hole at an opposite end of the side plate; and
    a mounting tray adapted to secure a power supply and located between the first clipping member and the second clipping member; the mounting tray comprising a flat base and a handle, and a clasping portion located on the handle and engaged in the clipping hole;
    wherein the mounting tray is slidable relative to the first clipping member and the second clipping member in a first direction, that is substantially parallel to the side plate, the handle is deformable in a second direction, that is substantially perpendicular to the first direction, to disengage the clasping portion from the clipping hole; and the limiting portion abuts a bottom portion of the flat base, for preventing the mounting tray from moving in a third direction opposite to the first directions;
    the mounting tray further comprises a mounting portion, the mounting portion defines a receiving space configured to receive the power supply, and two pairs of retaining portions are located on opposite sides of the receiving space, to engage with the power supply; and
    the mounting portion is located on a front side of the flat base, and the clasping portion is located on a back side of the flat base.

2. The mounting apparatus of claim 1, wherein the flat base comprises a cable management portion, the cable management portion comprises two clamping pieces extending from the flat base, the two clamping pieces are substantially parallel to each other and perpendicular to the flat base, and the two clamping pieces are configured to position a first cable connected to the power supply therebetween.

3. The mounting apparatus of claim 1, wherein the mounting portion comprises a first mounting frame and a second mounting frame opposite to the first mounting frame, and the first mounting frame and the second mounting frame together define the receiving space.

4. The mounting apparatus of claim 3, wherein the first mounting frame defines a cutout to receive a second cable of the power supply.

* * * * *